June 4, 1935. O. HANNESSCHLAGER 2,004,071
STRAINER
Filed Nov. 18, 1933

Otto Hannesschlager Inventor
Jesse R. Stone
Lester B. Clark
By
Attorneys

Patented June 4, 1935

2,004,071

UNITED STATES PATENT OFFICE 2,004,071

STRAINER

Otto Hannesschlager, Houston, Tex.

Application November 18, 1933, Serial No. 698,679

6 Claims. (Cl. 166—5)

My invention relates to well strainers to be employed in deep wells for keeping sand and sediment from entering the well.

It is an object of the invention to provide a strainer including a perforated pipe having rings thereon spaced apart and to provide means whereby an accurate spacing may be easily and quickly accomplished.

I desire to provide a strainer in which the straining openings are formed between adjacent rings which may be dropped downwardly along the pipe and easily and quickly adjusted into properly spaced position on the pipe.

I also have as an object to provide a spacing element which may be employed to space the rings from each other and from the pipe and also to register the rings accurately in position.

I desire to provide a spacing device which will wedge the ring tightly in place without the necessity of further securing means.

In the drawing herewith a preferred embodiment of the invention is disclosed.

Figures 1, 2:
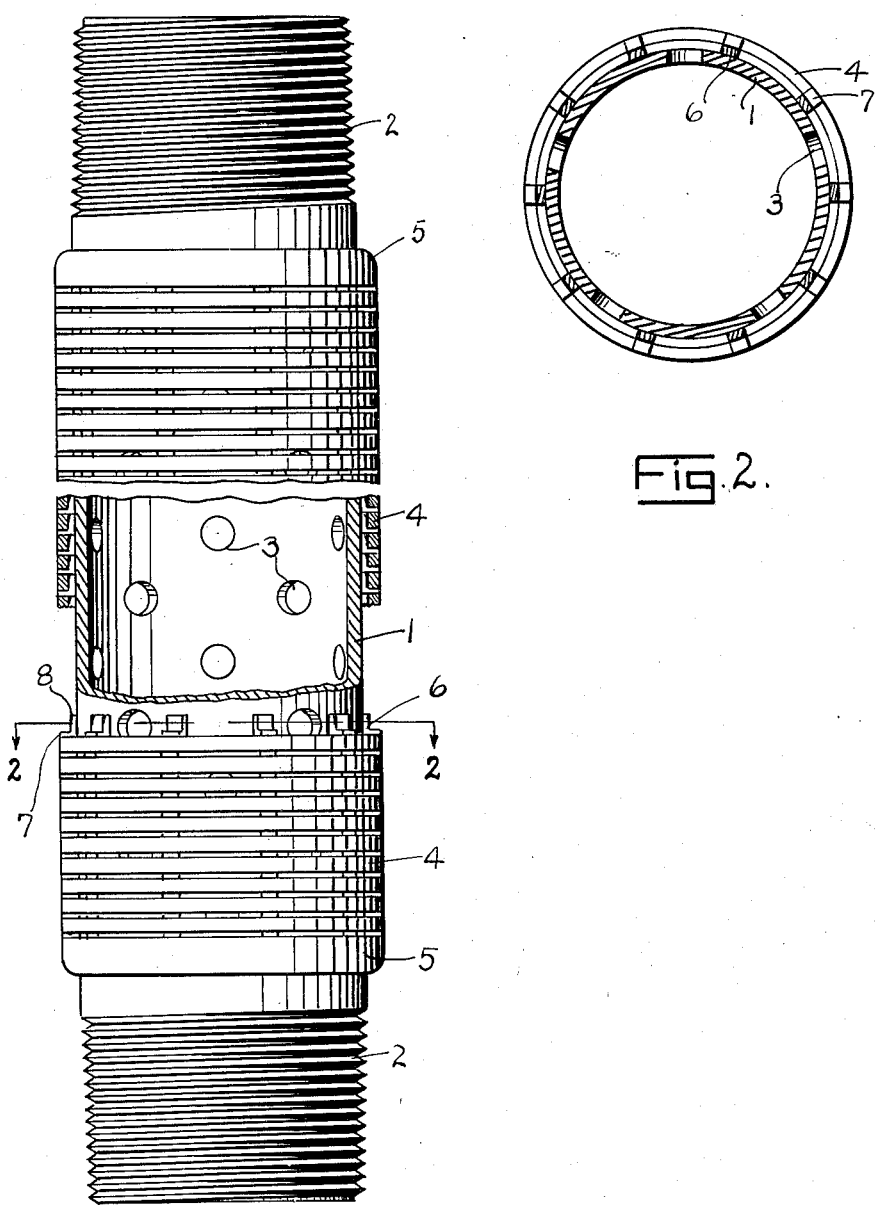
Fig. 1 is a side view, certain parts being broken away in central, vertical section illustrating a section of strainer formed according to my invention.
Fig. 2 is a transverse section taken on the plane 2—2 of Fig. 1.

My strainer is formed upon a perforated pipe 1 of a common construction. The ends of each pipe section are threaded at 2 for engagement with adjacent sections of strainer or pipe. The strainer openings 3 are formed in uniformly spaced relation through the wall of the pipe on the portion thereon where the straining effect is desired.

Upon the perforated portion of the pipe I place a series of uniformly spaced rings 4. These rings are larger in internal diameter than the outside diameter of the pipe. At the ends of the perforated portion of the pipe I fix rings 5 slightly wider than the straining rings, and these rings 5 may be welded to the pipe if desired to firmly fix them in position, the upper ring 5 being fixed in position after the straining rings have been properly placed upon the pipe.

Between adjacent rings are a plurality of spacers 6. As will be noted from Fig. 1, these spacers are of L-shape in side elevation and the lower horizontal portion 7 thereof is made of the proper thickness desired in spacing apart the rings 4. The upper portion of the L shown at 8 is of the desired thickness to space the ring properly from the pipe. This upper arm 8 is tapered slightly adjacent the upper end so that when a straining ring 4 is dropped downwardly thereon it will engage the tapered upper end and may then be pressed down with a wedge fit over the upper arm of the spacer and firmly fix the ring in position.

In assembling this screen the lower ring 5 will be welded in position and a row of spacers around the pipe will be seated on the upper end of the ring. The straining ring 4 may then be dropped downwardly along the pipe to engage around the upper ends 8 of the spacing elements. These spacers are of proper thickness so that when the ring is forced downwardly thereon it will tightly engage said ring against the spacer and frictionally engage the same with the pipe. When the ring seats on the lower spacing arm 7 of the said spacer, it will be fixed in position a uniformly spaced distance from the nearest adjacent lower ring. One ring after another will be thus fixed in position on the pipe and then the upper ring 5 will be welded in position and the screen section will be completed.

In forming a screen of this character it will be obvious that the rings employed may be made of special material and properly treated so that the screen will be adapted to last for long periods of time. Furthermore, the accurate forming of these rings and the spacing elements will enable the manufacturer to seat the rings at the desired distance apart, said distance depending on the thickness of the lower arm 7 of the spacer. Thus the spacing opening can be varied and in all cases it will be of uniform width.

While I have shown the spacing rings of uniform thickness throughout, it is obvious that the thickness of the ring may vary from the outside toward the inside, and also that the lengths of the rings may also be varied, all coming within the scope of this invention.

Having described the invention, what I claim is:

1. A well screen comprising a section of perforated pipe, continuous rings of metal of equal length and of larger internal diameter than the outer diameter of said pipe arranged adjacent each other upon the pipe and separate spacers between said rings and said pipe to space said rings uniformly from the pipe and also acting to space said rings uniformly from each other along the pipe.

2. A well screen comprising a section of perforated pipe, continuous metal rings on said pipe, said rings being of equal length and of larger internal diameter than the outer diameter of said pipe, and spacers of L-shape in longitudinal section between said rings, one arm of each spacer acting to space adjacent rings apart and the other arm thereof between a ring and the pipe acting to space said rings from the pipe.

3. A well screen including a perforated pipe body, screening means comprising narrow bands placed over said pipe and separate means between said rings and the pipe to space said rings uniformly concentric therewith and hold said rings frictionally in place.

4. A well screen including a perforated pipe body, screening means comprising narrow bands placed over said pipe and separate means between said rings and the pipe to space said rings uniformly concentric therewith and hold said rings frictionally in place, said spacing means also acting to space said rings from each other a predetermined amount.

5. A well screen comprising a perforated pipe body, strainer rings of larger diameter than said pipe fitting loosely about the same, spacer members having an arm radial to the axis of said pipe between adjacent rings to space said rings apart and an arm on each of said members to fit longitudinally of said pipe and between said pipe and rings to space said rings from said pipe.

6. A well screen comprising a perforated pipe body, strainer rings of larger diameter than said pipe fitting loosely about the same, spacer members having an arm radial to the axis of said pipe between adjacent rings to space said rings apart and an arm on each of said members to fit longitudinally of said pipe and disposed between said pipe and rings and spacing said rings from said pipe, said last named arm being tapered slightly to wedge beneath said rings and hold said rings frictionally in place.

OTTO HANNESSCHLAGER.